Aug. 3, 1937.  C. P. STOCKER  2,088,620

FREQUENCY CHANGING SYSTEM

Filed June 18, 1936  2 Sheets-Sheet 1

INVENTOR.
CLOSMAN P. STOCKER
BY Woodling and Krost.
ATTORNEY.

Aug. 3, 1937.   C. P. STOCKER   2,088,620
FREQUENCY CHANGING SYSTEM
Filed June 18, 1936   2 Sheets-Sheet 2
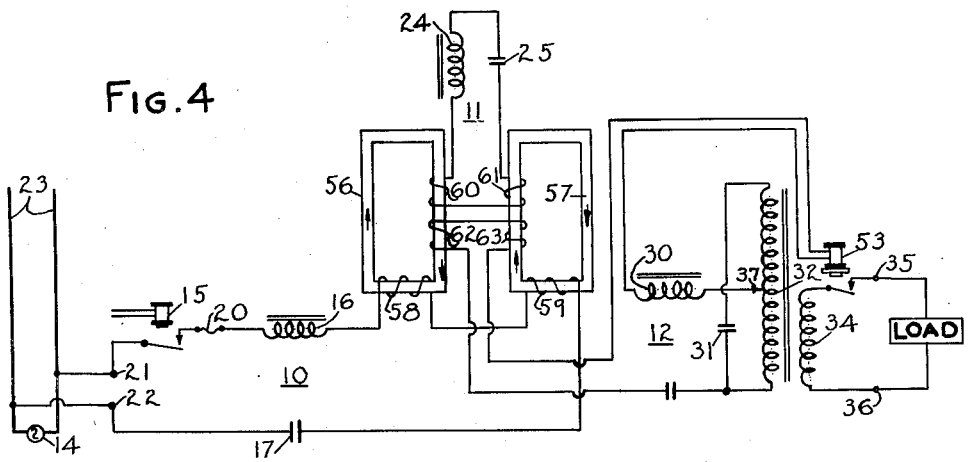
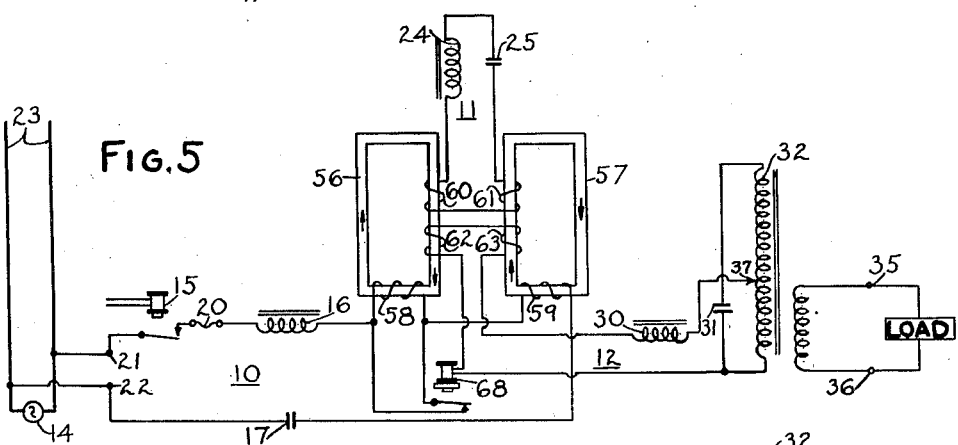
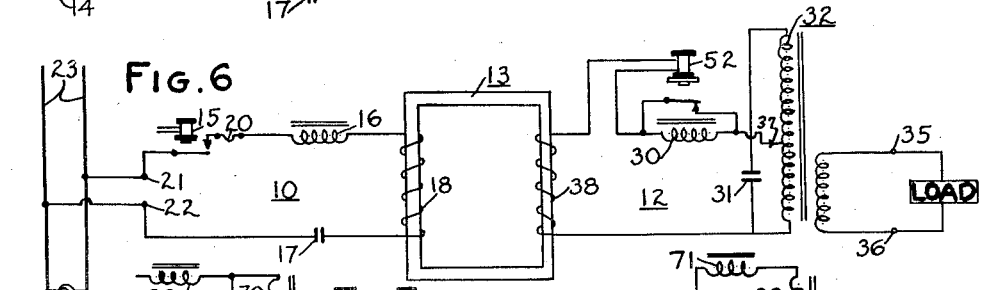
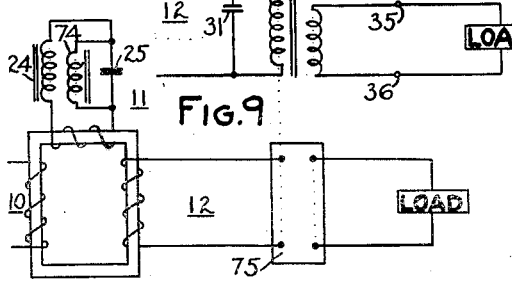
INVENTOR.
CLOSMAN P. STOCKER
BY Woodling and Krost
ATTORNEY.

Patented Aug. 3, 1937

2,088,620

UNITED STATES PATENT OFFICE 2,088,620

FREQUENCY CHANGING SYSTEM

Closman P. Stocker, Lorain, Ohio, assignor of one-half to E. M. Heavens, Elyria, Ohio Application June 18, 1936, Serial No. 85,964

20 Claims. (Cl. 172—281)

My invention relates generally to frequency changing systems, and more particularly to static frequency changing systems.

My frequency changing system herein described comprises in general an arrangement of a plurality of magnetically coupled circuits disposed to be energized by a single frequency source of alternating current and adapted to cause currents of at least three beat frequencies to flow in the system, taken in combination with output means shunting a portion of one of the said plurality of magnetically coupled circuits for providing a current having the desired changed frequency. In accordance with my invention, the plurality of magnetically coupled circuits are each arranged to oscillate at such a frequency that the sum of the frequencies of the magnetically coupled circuit substantially equals to an integer times the frequency of the alternating current supply source which delivers energy to, and sustains the oscillations of, the magnetically coupled circuit of my frequency changing system.

An object of my invention is to provide for insuring reliable starting of the flow of the oscillating currents in the plurality of magnetically coupled circuits of my frequency changing system, particularly when my frequency changing system is operating under load.

A further object of my invention is to provide for insuring reliable starting of the flow of oscillating currents in the magnetically coupled circuits by causing a transient starting electrical condition to take place in my frequency changing system.

A still further object of my invention is to provide for establishing an uni-directional flux in the coupling that magnetically couples the plurality of tuned circuits for increasing the ease of starting the flow of the oscillating currents in the magnetically coupled circuits of my frequency changing system.

Another object of my invention is to provide for governing the flow of the current in the output means in response to an electrical condition in my frequency changing system.

A still further object of my invention is to provide for governing the flow of the current in the output means in response to an electrical condition of one of the said plurality of magnetically coupled circuits.

It is also an object of my invention to provide for interrupting the flow of the current in the output means when the oscillating current in the magnetically coupled circuit ceases flowing.

Another object of my invention is to provide for shunting a portion of one of the said plurality of magnetically coupled circuits by a stabilizing output means which provides a current having the desired changed frequency.

A further object of my invention is the provision of a stabilizing means for shunting a portion of one of the plurality of magnetically coupled circuits to by-pass a portion of the oscillating current from the said shunted portion of the said magnetically coupled circuit with the point of view of giving stability in the output source throughout a wide range of load conditions.

A further object of my invention is to provide for operating the shunting or stabilizing means substantially at or near the knee of the magnetization curve of the iron core which comprises a part of the shunting or stabilizing means.

A still further object of my invention is to increase the effective capacity of the said magnetically coupled circuit to which the output load circuit is connected by utilizing a transformer to step up the voltage impressed upon the condenser, wherein the arrangement stabilizes the oscillating current flowing in the magnetically coupled circuit and also permits more power to be obtained from a given set of inductance elements and condensers.

Another object of my invention is to provide for so arranging the magnetically coupled oscillating circuit that substantially no voltages of the frequency of the alternating current supply source are produced in the said plurality of magnetically coupled oscillating circuits which receive energy from the alternating current supply source to sustain their oscillations.

Other objects and a fuller understanding of my invention may be had by referring to the following description and claims, taken in conjunction with the accompanying drawings, in which like parts of my invention are designated by like reference characters, and in which:

Figure 4 is a further modified form of my static frequency changing system;

Figure 5 is a view similar to Figure 4, except that the system shown in Figure 5 is provided with a starting arrangement;

Figure 6 is a view of a further modified form of my static frequency changing sytem;

Figure 7 is a fragmentary view of a portion of my frequency changing system, showing a modified form of an output load circuit;

Figure 8 is a further modified and fragmentary view of a portion of my static frequency changing system, showing particularly the output load circuit and the additional small inductance used for an audible ringing signal; and Figure 9 is a fragmentary and modified form of my frequency changing system, showing stabilizing means associated with the balancing tuned circuit.

Figure 1:
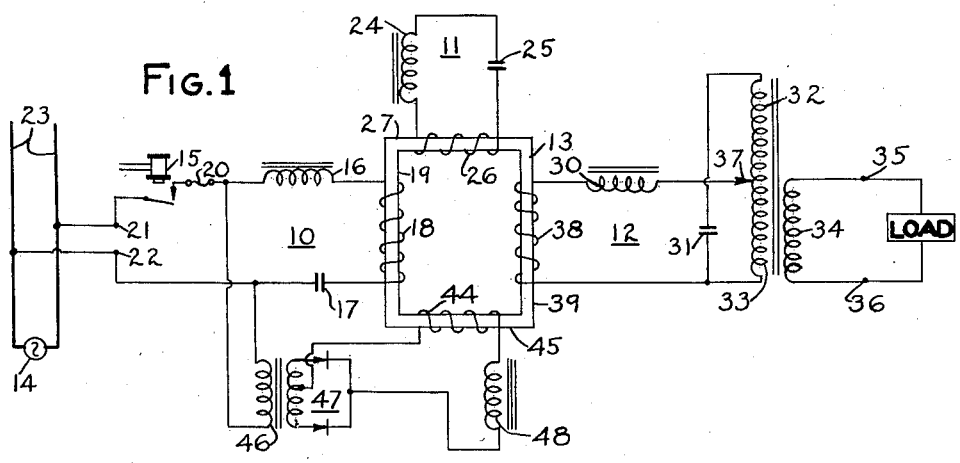
Figure 1 shows a static frequency changing arrangement embodying the features of my invention.

With reference to Figure 1 of the drawings, my invention comprises in general, a plurality of tuned circuits 10, 11, and 12 which are magnetically coupled together by magnetic core means 13. As illustrated, the tuned circuit 10 is arranged to be energized by a single frequency source of alternating current indicated generally by the reference character 14. Briefly, the three tuned circuits are so adjusted and tuned that when the tuned circuit 10 is energized by a single frequency source of alternating current, there is produced in the frequency changing system at least three beat frequencies. In other words, the two tuned circuits 11 and 12 are so adjusted to oscillate at such a frequency that the sum of the frequencies of the two tuned circuits 11 and 12 substantially equal to an integer times the frequency of the alternating current supply source indicated generally by the reference character 14, which may include any suitable generator, transformer, power line, or net work capable of supplying the necessary power at a suitable frequency to operate the circuit.

The tuned circuit 10 may be generally referred to as the power input tuned circuit and comprises principally inductance element 16, a capacitive element 17, and a winding 18 surrounding the left hand side leg 19 of the magnetic core means 13. As illustrated, the power input tuned circuit 10 is provided with two input terminals 21 and 22 which are connected to the supply conductors 23 and energized by the alternating current supply source 14. Any suitable means may be utilized to control the energization of the power input tuned circuit 10, such for example, as a switch or a relay 15 controlled by some remote condition. A protective device such for example, as a fuse 20 may be provided to prevent damage caused by overloading of my frequency changing system. The constants of the inductance element 16, the capacitive element 17, and the winding 18 are so selected that the power input tuned circuit 10 resonates at a frequency which is substantially the same as the frequency of the alternating current supply source 14. This frequency may be designated as $W_1$. Therefore, when the contact of the relay 15 is closed, there is caused to flow in this power input tuned circuit an oscillating current having a frequency substantially equal to the frequency of the alternating current supply source 14.

As the alternating current flows through the winding 18, a magnetic flux is established in the magnetic core means 13 and induces a current in both the tuned circuits 11 and 12. Under proper elected conditions, these induced currents sustain oscillations in these two tuned circuits 11 and 12.

In this description, the tuned circuit 12 may be referred to as a power output circuit and the tuned circuit 11 may be referred to as a balancing circuit.

As illustrated, the balancing tuned circuit 11 comprises an inductance element 24, a capacitive element 25 and a winding 26 surrounding the upper end leg 27 of the magnetic core means 13. The power output circuit comprises an inductance element 30, a capacitive element 31, a stabilizing output transformer 32, and a winding 38 surrounding the right hand side leg 39 of the magnetic core means 13. The constants of the inductance element 24, the capacitive element 25 and the winding 26 of the balancing tuned circuit 11 and the constants of the inductance element 30, the capacitive element 31, the stabilizing output transformer 32 and the winding 38 of the power output tuned circuit 12 are so selected that the circuits 11 and 12 oscillate at such a frequency that the sum of the frequencies of the two tuned circuits 11 and 12 substantially equals to an integer times the frequencies of the power input tuned circuit 10 or the frequency of the alternating current supply source 14. In other words, the plurality of magnetically coupled tuned circuits are so disposed to cause oscillating currents to be present in my frequency changing system having at least three beat frequencies, which receive energy from, and are sustained by, the alternating current supply source 14. By designating the frequencies of the oscillating current in the balancing tuned circuit 11 as $W_2$ and the frequency of the oscillating current in the power output tuned circuit 12 as $W_3$, we may express the three beat frequencies equations as follows:

(1) $W_1 = W_2 + W_3$
(2) $W_2 = W_1 - W_3$
(3) $W_3 = W_1 - W_2$

Let it be assumed for example, that the frequency of the alternating current supply source 14, which energizes my frequency changing system, is 60 cycles per second, and that it is desired to have a frequency of 15 cycles per second impressed upon the load in the output circuit 12. Under this assumption, and in conformity with Equation (1) above, the power output tuned circuit 12 is so adjusted or tuned to resonate at a frequency of 15 cycles per second. In order to satisfy this equation, the balancing tuned circuit 11 is adjusted or tuned at a frequency of 45 cycles per second. Thus, the sum of the frequencies $W_2$ and $W_3$ of the balancing tuned circuit 11 and output tuned circuit 12, respectively, equals the frequency $W_1$ of the alternating current supply source 14. Expressing the same condition by Equation (2), it may be said that the frequency $W_2$ of the balancing tuned circuit 11 equals the difference between the frequency $W_1$ of the alternating current supply source 14 and the frequency $W_3$ of the tuned output circuit 12. Expressing the same condition by Equation (3), it is noted that the frequency $W_3$ of the tuned output circuit 12 equals to the difference between the frequency $W_1$ of the alternating current supply source 14 and the frequency $W_2$ of the tuned balancing circuit 11. While I have assumed certain frequencies for the tuned circuits 10, 11, and 12, it is to be understood that any other selected values may be obtained so long as they satisfy the three beat frequency equations, hereinabove mentioned.

The power output tuned circuit 12 is arranged to supply power to the load which is connected in circuit relation with the secondary winding 34 of the stabilizing output transformer 32. In the actual embodiment of my invention, all of the illustrated parts are assembled as a unit and provided with the output terminals 35 and 36, together with the input terminals 21 and 22. Therefore, when installing my assembled frequency changing system, it is only necessary to connect the two input terminals 21 and 22 to a suitable alternating current supply source, and connect the load to the two output terminals 35 and 36. The primary winding 33 of the stabilizing output transformer 32 is provided with an intermediate tap 37 so that the capacitive element 31 is operated at a higher voltage than that at which it would be operated if it were connected directly across the lower portion of the primary winding 33. This means that the effectiveness of the capacitive element 31 is materially increased so that for a given power output, the capacitive element 31 and the inductance element 30 may be made considerably smaller than it would have to be if the capacitive element 31 were not impressed with a step-up voltage by reason of the intermediate tap 37 of the primary winding 33 of the output stabilizer transformer 32. In accordance with the principles of my invention, the magnetic core of the stabilizing output transformer 32 is normally operated near the knee of the saturation curve. Consequently, the peak voltages impressed upon the capacitive element 31 resulting from the surges and the transient current are limited. Thus, when the load is removed and the current through the power output tuned circuit 12 tends to increase, the voltage across the various elements also tends to increase. This increase in the voltage across the capacitive element 31 and the primary winding 33 of the stabilizing output transformer 32 reduces the impedance of the stabilizing output transformer 32, which in turn tends to reduce and limit the rising voltage and current from increasing beyond a stable value in the power output tuned circuit 12 as the load is reduced. By reason of the fact that the stabilizing output transformer 32 prevents or reduces any increase in the oscillating current in the power output tuned circuit 12 as the load is removed, the said transformer may be characterized as a stabilizing transformer. This is a very important feature for the reason that my frequency changing system may be operated throughout a relatively wide range of load conditions at the same time maintaining stability as well as increasing the effective capacitive reactance of the capacitive element 31. During the stabilizing action of the output transformer 32, it functions to by-pass a portion of the oscillating current from the said shunted portion of the power output tuned circuit 12. In this manner, the value of the shunted current is a function of the load condition upon the secondary winding 34 of the output stabilizing transformer 32.

To facilitate the starting of the oscillation in my frequency changing system, I provide for establishing a uni-directional flux in the magnetic core means 13. Any suitable means may be employed to magnetize the magnetic core means by a uni-directional flux. As illustrated, I utilize a winding 44 surrounding the lower end leg 45 of the magnetic core means, which winding is arranged to be energized by a uni-directional current, supplied from any suitable source, such for example, as a battery or a rectified source of alternating current as illustrated in Figure 1. The rectified source of alternating current may be provided by utilizing the transformer 46 having its primary winding connected across the opposite side of the power input tuned circuit 10 and having its secondary winding connected in circuit relation with a double wave rectifier circuit 47, which is in turn connected in circuit relation to the winding 44 through an inductance element 48. By utilizing a uni-directional flux to magnetize the magnetic core means 13, my frequency changing system shown in Figure 1 will start producing oscillations of its own accord when the contact of the relay 15 is closed, provided the load is not too large. When the oscillations are once started, the load may be increased to its normal operating value. There is an optimum value to which the load current may be increased because when the load current increases beyond the said optimum value, the oscillations cease flowing in which case, the system becomes inoperative until the load current is reduced to a value at which the system may automatically start oscillating again.

Figure 2:
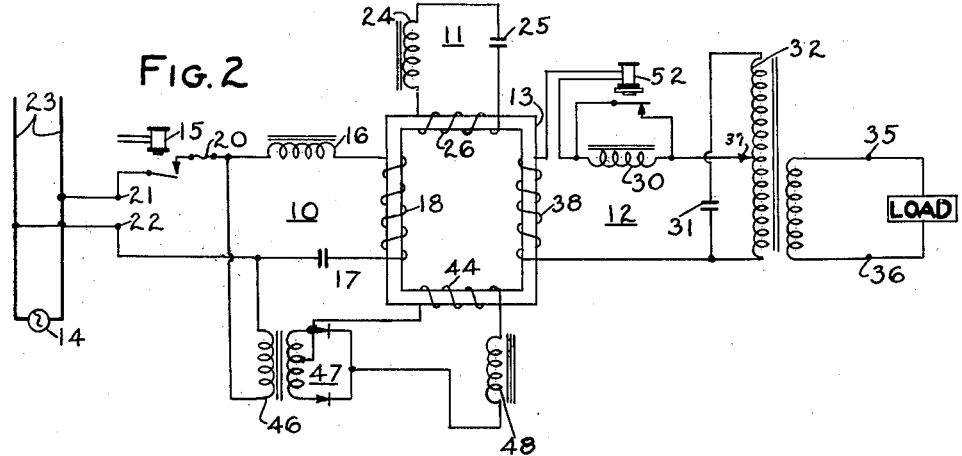
Figure 2 is a modified form of my static frequency changing system shown in Figure 1, in that the system is provided with a starting arrangement.

In Figure 2 of the drawings, I show a modified form of my system shown in Figure 1 in that Figure 2 is a system arranged to start under load. This is accomplished by causing a transient starting electrical condition to take place in the system to start the oscillations even under load. This transient starting electrical condition may be obtained by storing energy through the system to start the oscillations. In accordance with this principle, I provide for connecting a slow operating relay 52 in series circuit relation with the power output tuned circuit 12 and having the contact of the relay short circuit the inductance element 30 when the relay is de-energized. This means that when the power input tuned circuit 10 is energized by the alternating current supply source 14 by the closing of the contact of the relay 15, there will be produced in the power output tuned circuit 12 a current having the same frequency as the frequency of the alternating current supply source 14. In other words, at this stage of the starting, there will be no oscillations taking place in the power output tuned circuit 12 because the inductance element 30 is short circuited. However, the current which flows through the power output tuned circuit 12 having the same frequency as the frequency of the alternating current supply source energizes the slow operating relay 52 and removes the short circuit around the inductance element 30 and allows the energy stored in the capacitive element 31 to discharge through the inductance element 30. The discharge is of an oscillating type and serves to start an oscillating current flowing in the power output tuned circuit 12 as well as in the power input tuned circuit 10 and the balancing tuned circuit 11. These oscillation are then maintained by, and receive energy from, the alternating current supply source 14.

In the operation of my frequency changing system shown in Figure 2, should the load current become too large and exceed the operating value, the oscillations will cease flowing. This means that the slow operation relay 52, which was energized by the oscillating current flowing in the output tuned circuit 12, becomes de-energized and short circuits the inductance element 30. This causes a transient condition to take place for starting the oscillations in my frequency changing system, provided that the load has in the meantime decreased below the operating value, so that oscillations may continue. In the event that the load has not decreased, below the operating value, the starting operation of the slow operating relay 52 continues to function until the load is decreased below the operating value, at which point the oscillations continue to exist.

Figure 3:
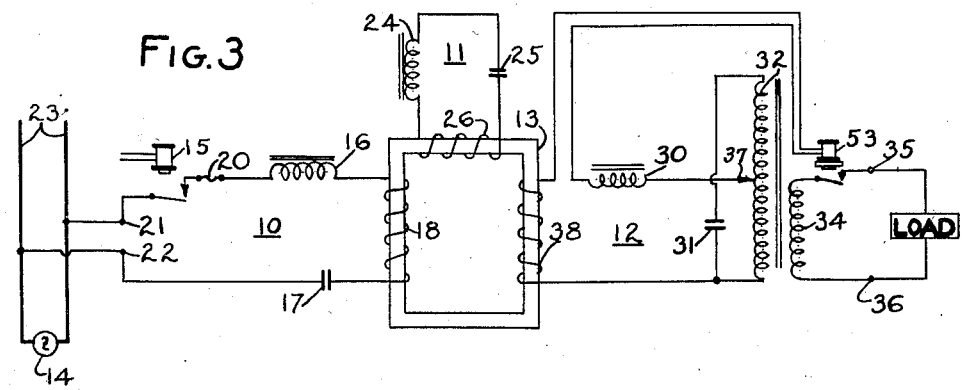
Figure 3 is a view of a modified form of my static frequency changing system.

In Figure 3, I show a further modified form of my invention, wherein oscillations may be started without magnetizing the magnetic core means by a uni-directional flux as shown and described in Figures 1 and 2. In this form of my invention, the circuits are so tuned that the sum of the frequencies $W_2$ and $W_3$ of the tuned balancing circuit 11 and the tuned output circuit 12 respectively, equals two times the frequency $W_1$ of the alternating current supply source 14. Therefore, the three beat frequency equations which satisfy this circuit arrangement may be expressed as follows:

(4) $2W_1 = W_2 + W_3$
(5) $W_2 = 2W_1 - W_3$
(6) $W_3 = 2W_1 - W_2$

Let it be assumed that the frequency of the alternating current supply source 14 is 60 cycles per second and that it is desired to obtain a frequency of 36 cycles per second for the load circuit. Under this assumption, the power output tuned circuit 12 would be adjusted to resonate at a frequency of 36 cycles per second, and the balancing tuned circuit 11 would be adjusted to resonate at a frequency of 74 cycles per second.

The frequency changing system shown in Figure 3 is self-starting with no load. Accordingly, I provide for disconnecting the load until the oscillations are once started in my frequency changing system. To accomplish this, I employ a slow operating relay 53 connected in series circuit relation with the power output tuned circuit 12 and having a contact which disconnects the load when the slow operating relay 53 is de-energized. Just as soon as the oscillating current starts to flow in the power output tuned circuit 12, the slow operating relay 53 is energized and the contact closes to complete the load circuit. In the event that the load current increases beyond the operated value, the oscillations in the power output tuned circuit 12 ceases to flow and the relay 53 becomes de-energized and this disconnects the load from the secondary winding 34 of the stabilizing output transformer 32. Immediately upon the de-energizing of the slow operating relay 53 and the disconnecting of the load from the secondary winding 34, oscillations will again take place in the power output tuned circuit 12 and energize the slow operating relay for connecting the load to the secondary winding 34 of the output stabilizing transformer 32. If the load current in the meantime has decreased below the operated value, the oscillations continue to exist for energizing the load. However, if the load current has not decreased in the meantime below the operated value, the starting oscillations of the slow operating relay 53 are continually repeated until the load current has decreased below the operating value.

In Figure 3, one of the frequencies in the power output tuned circuit 12 and the balancing tuned circuit 11 must be higher and the other frequency must be lower than the frequency of the alternating current supply source 14. The higher frequency must be within the limits $W_1$ and $2W_1$.

Also in this case, there are ranges of the frequency of the power output tuned circuit 12 and the balancing tuned circuit 11 which may be influenced by the voltages of the frequency of the alternating current supply source 14. This is particularly true where the frequency of the power output tuned circuit 12 and the balancing tuned circuit 11 approaches the value of the frequency of the alternating current supply source. In order to offset this influence of the voltages of the frequency of the alternating supply source, I provide for so magnetically coupling the oscillating circuits that substantially no voltages of the frequency of the alternating current supply source 14 are induced in the power output tuned circuit 12 and the balancing tuned circuit 11.

The foregoing arrangement is illustrated in Figure 4 which is substantially identical to Figure 3, except that the magnetic core means comprises two separate magnetic cores 56 and 57. As illustrated, the magnetic core 56 is energized by a winding 58 and the magnetic core 57 is energized by a winding 59, which are connected in series with the power input tuned circuit 10. The two windings 58 and 59 are so arranged that the magnetic flux in the magnetic cores 56 and 57 flow in the opposite direction, as illustrated by the arrow lines. The power output tuned circuit 12 is coupled to the two magnetic cores 56 and 57 by means of the two windings 62 and 63 which embrace the inside legs of the two magnetic cores 56 and 57. The balancing tuned circuit 11 is coupled to the two magnetic cores 56 and 57 by the two windings 60 and 61, which also embrace the inside adjacent legs of the two magnetic cores 56 and 57. The windings 60 and 61 and the windings 62 and 63 are so arranged that substantially no voltages of the frequency of the alternating current supply source 14 are induced in the power output tuned circuit 12 and the balancing tuned circuit 11. In other words, the open circuit voltage of the windings 60 and 61 is zero. Also the open circuit voltage of both the windings 62 and 63 is zero. The operation of my frequency changing system shown in Figure 4 is substantially the same as that described with reference to Figure 3 and is self-starting under no load. The advantage of the circuit shown in Figure 4 over that shown in Figure 3 is that the frequency ranges of the power output tuned circuit 12 and the balancing tuned circuit 11 are not affected by the voltages of the frequencies of the alternating current supply source 14. While I have shown two separate magnetic cores 56 and 57, it is to be clearly understood that the same results may be obtained by having one magnetic core with two magnetic paths.

In Figure 5, I show a modified form of my invention shown in Figure 4, wherein in Figure 5 the system is provided to cause a transient starting electrical condition to take place in the system for starting the oscillations. This transient starting electrical condition in Figure 5 is produced by short circuiting the winding 58 by the slow operating relay 68 which is connected in series circuit relation with the power output tuned circuit 12. When my frequency changing system in Figure 5 is first energized by the alternating current supply source 14 by the closing of the contact of the relay 15, there is induced in the power output tuned circuit 12, a current having a frequency substantially equal to the frequency of the alternating current supply source 14. Under this condition, the system will not begin to oscillate for the reason that the winding 58 is still short circuited by the relay 68, but just as soon as the current having a frequency substantially equal to the frequency of the alternating current supply source energizes the relay 68 and removes the short circuited condition of the winding 58, there is produced a transient impulse for starting oscillations in the system. The oscillating current set up in the power output tuned circuit 12 continues to energize the relay 68, so that the system continues to function and supply the desired changed frequency current through the load. The arrangement shown in Figure 5 is self-starting under load. However, in the event that the load current exceeds the optimum or operating value, the oscillations in the power output tuned circuit 12 will cease to flow in which case the relay 68 becomes de-energized for short circuiting the winding 58. Just as soon as the winding 58 is short circuited, a current of the frequency of the alternating current supply source 14 is induced in the power output tuned circuit 12 for again energizing the relay 68 for producing a starting impulse. If the load current has decreased in the meantime to a value less than the optimum or operating value, the system continues to oscillate to supply the desired changed frequency to the load. Thus, in the event that the load current has not decreased below the optimum or operating value, the relay 68 will continue to repeat until the load current decreases below the optimum or operating value.

In Figure 6, I show a modified form of my invention shown in Figure 2, in that the system shown in Figure 6 is not provided with a separate balancing tuned circuit 11. Also the circuit in Figure 6 is not provided with means to establish a uni-directional flux in the magnetic core means 13. In Figure 6, the power input circuit 10 is selected or tuned to resonate at a frequency $W_2$, which is preferably lower than the frequency of the alternating current supply source 14. In other words, the power input tuned circuit 10 constitutes a balancing tuned circuit which takes the place of the balancing tuned circuit 11 shown in Figure 2. The power output tuned circuit 12 and the power input tuned circuit 10 are so adjusted or selected that the sum of the frequencies of the oscillating current in these two circuits is substantially equal to the frequency of the alternating current supply source 14. This means that one of the beat frequencies is the frequency of the alternating current supply source 14 itself, and that the other two beat frequencies are the frequencies of the oscillating current flowing in the power input tuned circuit 10 and the power output tuned circuit 12. Let it be assumed that the frequency of the alternating current supply source 14 is 60 cycles per second and it is desired to have a frequency of 20 cycles per second in the load circuit, then the power input tuned circuit 10 would be so selected or adjusted that the frequency of the oscillating current flowing in said circuit would be 40 cycles per second. The operation of the slow operating relay 52 for starting the oscillations in the system shown in Figure 6 is substantially the same as that described for the relay 52 in Figure 2.

Instead of using a stabilizing output transformer 32 as shown in Figures 1, 2, 3, 4, 5, and 6, the stabilizing output transformer may take the form as that illustrated in Figure 7. With this type of output stabilizing transformer, the voltage impressed upon the capacitive inductance 31 is not stepped up. Accordingly, it does not have the advantage of increasing the effective capacitive of the capacitive reactance 31, as does the stabilizing output transformer 32 shown in the preceding view of the drawings. However, in some installations, the output transformer shown in Figure 7 may be employed with good results. In those installations, where my frequency changing system is adapted to supply a ringing current to a telephone system, the audible ring back tone may be readily provided for by utilizing an additional small inductance element 71 which is connected in series with the capacitive inductance 31, see Figure 8. This provides a very simple and effective means for controlling the amount of the output current. At very low frequencies, the inductance of the additional small inductance element 71 is very small and consequently does not have any appreciable effect in modifying the wave form in the output current. However, at high frequencies, the inductance of the additional small inductance element 71 increases to such point that it is sufficient to cause modification or changes in the wave form of the output current to provide the audible ringing signal of a telephone system. In Figure 9, I show a modified form of my frequency changing system, in that a stabilizing means 74 is associated with the balancing tuned circuit 11. This stabilizing means 74 may comprise any suitable nonlinear impedance, such as a winding mounted on a saturable core. The output circuit 12 may be connected to the load circuit in any one of the methods described in the specification and illustrated in the previous figures of the drawings. Hence, the unit indicated generally by the reference character 75 may designate any one of such methods. However, inasmuch as the balancing tuned circuit 11 in Figure 9 is provided with a stabilizing means 74, the output transformer between the power output circuit 12 and the load circuit may or may not be of the stabilizing type as previously described.

In the practice of my invention, the magnetic core means which magnetically couples the plurality of circuits must be capable of being saturated or must be one in which the impedance changes with current values. It is to be observed that each of the forms of my invention comprises, in general, an arrangement of a plurality of magnetically coupled circuits disposed to be energized by a single frequency source of alternating current and adapted to cause currents of at least three beat frequencies to flow in the system, taken in combination with output means shunting a portion of one of the said plurality of magnetically coupled circuits for providing a current having the desired changed frequencies. In Figure 6, however, it is noted that one of the three beat frequencies is the frequency of the alternating current supply source 14 itself. Therefore, in the claims, the phrase "three beat frequencies" may mean three frequencies wherein the sum of two of the frequencies equals to the third frequency times an integer and may be expressed by the following equation:

$$nW_1 = W_2 + W_3$$

where $n$ is an integer.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A frequency changing system adapted to be energized by a source of alternating current comprising, in combination, a plurality of oscillating circuits, each arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source for delivering energy to, and sustaining the oscillations of, the oscillating circuits, and output means connected across a portion of one of the oscillating circuits for supplying a current having the desired changed frequency.

2. A frequency changing system adapted to be energized by a source of alternating current comprising, in combination, a plurality of oscillating circuits, each having an inductance element and a capacitive element and arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source and for delivering energy to, and sustaining the oscillations of, the oscillating circuits, and output means connected across an element of one of the oscillating circuits for supplying a current having the desired changed frequency.

3. A frequency changing system adapted to be energized by a source of alternating current, comprising, in combination, a plurality of oscillating circuits, each having an inductance element and a capacitive element and arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source and for delivering energy to, and sustaining the oscillations of, the oscillating circuits, and output means connected across the capacitive element of one of the oscillating circuits for supplying a current having the desired changed frequency.

4. A frequency changing system adapted to be energized by a source of alternating current comprising, in combination, a plurality of oscillating circuits, each having an inductance element and a capacitive element and arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source and for delivering energy to, and sustaining the oscillations of, the oscillating circuits, and a stabilizing output transformer shunting the capacitive element of one of the oscillating circuits for providing an output current having the desired changed frequency.

5. A frequency changing system adapted to be energized by a source of alternating current comprising, in combination, a plurality of oscillating circuits, each having an inductance element and a capacitive element and arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source and for delivering energy to, and sustaining the oscillations of, the oscillating circuits, and a stabilizing output transformer having a winding shunting the capacitive element of one of the oscillating circuits and arranged to increase the effective capacitive reactance of the said capacitive element.

6. A frequency changing system adapted to be energized by a source of alternating current comprising, in combination, a plurality of oscillating circuits, each having an inductance element and a capacitive element and arranged to oscillate at such a frequency that the sum of the frequencies of the oscillating circuits substantially equals to an integer times the frequency of the alternating current supply source, magnetic core means for coupling the said oscillating circuits, means to establish an unidirectional flux in the magnetic core means, means for magnetizing the magnetic core means by the alternating current supply source and for delivering energy to, and sustaining the oscillations of, the oscillating circuits, means for causing a transient starting electrical condition in the system, and a stabilizing output transformer shunting the capacitive element of one of the oscillating circuits for providing an output current having the desired changed frequency.

7. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a plurality of tuned circuits, each having a winding magnetically coupled to the magnetic core means and arranged to sustain oscillations by energy received from the said energized first mentioned tuned circuit, output means connected in circuit relation with one of the said plurality of tuned circuits for providing a current having the desired changed frequency, and stabilizing means associated with one of the said plurality of tuned circuits.

8. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a plurality of tuned circuits, each having a winding magnetically coupled to the magnetic core means and arranged to receive energy from the said energized first mentioned tuned circuit, output means shunting a portion of one of the said plurality of tuned circuits for providing a current having the desired changed frequency, and means responsive to an electrical condition of the system for governing the flow of the current in the output means.

9. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a plurality of tuned circuits, each having a winding magnetically coupled to the magnetic core means and arranged to receive energy from the said energized first mentioned tuned circuit, output means shunting a portion of one of the said plurality of tuned circuits for providing a current having the desired changed frequency, and a relay responsive to an electrical condition of one of the said plurality of tuned circuits for governing the flow of the current in the output means.

10. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a plurality of tuned circuits, each having a winding magnetically coupled to the magnetic core means and arranged to receive energy from the said energized first mentioned tuned circuit, output means shunting a portion of one of the said plurality of tuned circuits for providing a current having the desired changed frequency, and means for interrupting the flow of the current in the output means when the oscillating current in one of the said plurality of tuned circuits ceases flowing.

11. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a plurality of tuned circuits, each having an inductance element and a capacitive element and a winding magnetically coupled to the magnetic core means and arranged to receive energy from the said energized first mentioned tuned circuit, a stabilizing transformer shunting the capacitive element of one of said plurality of tuned circuits for providing a current having the desired changed frequency.

12. A frequency changing system adapted to be energized by a source of alternating current comprising, in combination, magnetic core means, a tuned circuit having a winding magnetically coupled to the magnetic core means, means for tuning the said circuit at a frequency substantially equal to an integer times the frequency of the alternating current supply source, the said tuned circuit being adapted to be energized by the source of alternating current, a plurality of tuned circuits, each having a winding magnetically coupled to the magnetic core means and arranged to receive energy from the said energized first mentioned tuned circuit, means for tuning each of the said plurality of tuned circuits at such a frequency that the sum of the frequencies of the said plurality of tuned circuits substantially equals to the frequency that the said first mentioned tuned circuit is tuned, and output means shunting a portion of one of said plurality of tuned circuits for providing a current having the desired changed frequency.

13. A frequency changing system adapted to be energized by a source of alternating current comprising, in combination, magnetic core means having two magnetic paths, a tuned circuit having means magnetically coupled to the magnetic core means and arranged to produce opposing fluxes in the two magnetic paths, the said tuned circuit being adapted to be energized by the source of alternating current, a plurality of tuned circuits, each having a winding magnetically coupled to the two magnetic paths so that substantially no voltages of the frequency of the alternating current supply source are produced in the said plurality of tuned circuits, output means shunting a portion of one of the said plurality of tuned circuits for providing a current having the desired changed frequency.

14. A frequency changing system adapted to be energized by a source of alternating current comprising, in combination, magnetic core means having two magnetic paths, a tuned circuit having means magnetically coupled to the magnetic core means and arranged to produce opposing fluxes in the two magnetic paths, the said tuned circuit being adapted to be energized by the source of alternating current, a plurality of tuned circuits, each having an inductance element and a capacitive element and a winding magnetically coupled to the two magnetic paths so that substantially no voltages of the frequency of the alternating current supply source are produced in the said plurality of tuned circuits, and a stabilizing output transformer having a winding shunting the capacitive element of one of the said plurality of tuned circuits for providing a current having the desired changed frequency.

15. A frequency changing system adapted to be energized by a source of alternating current comprising, in combination, magnetic core means having two magnetic paths, a tuned circuit having means magnetically coupled to the magnetic core means and arranged to produce opposing fluxes in the two magnetic paths, the said tuned circuit being adapted to be energized by the source of alternating current, a plurality of tuned circuits, each having a winding magnetically coupled to the two magnetic paths so that substantially no voltages of the frequency of the alternating current supply source are produced in the said plurality of tuned circuits, output means shunting a portion of one of the said plurality of tuned circuits for providing a current having the desired changed frequency, and means for causing a transient starting electrical condition in the system.

16. A frequency changing system adapted to be energized by a source of alternating current comprising, in combination, magnetic core means having two magnetic paths, a tuned circuit having means magnetically coupled to the magnetic core means and arranged to produce opposing fluxes in the two magnetic paths, means for tuning said circuit at a frequency substantially equal to an integer times the frequency of the alternating current supply source, the said tuned circuit being adapted to be energized by the source of alternating current, a plurality of tuned circuits, each having a winding magnetically coupled to the two magnetic paths so that substantially no voltages of the frequency of the alternating current supply source are produced in the said plurality of tuned circuits, means for tuning each of the said plurality of tuned circuits at such a frequency that the sum of the frequencies of the said plurality of tuned circuits substantially equals to the frequency that the first mentioned tuned circuit is tuned, and output means shunting a portion of one of the said plurality of tuned circuits for providing a current having the desired changed frequency.

17. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a second tuned circuit having a winding magnetically coupled to the magnetic core means and arranged to receive energy from the said energized first mentioned tuned circuit, means for tuning each of the two tuned circuits at such a frequency that the sum of the tuned frequencies of the two tuned circuits substantially equals to an integer times the frequency of the alternating current supply source, means for causing a transient starting condition in the system, and output means shunting a portion of the second mentioned tuned circuit for providing a current having the desired changed frequency.

18. A frequency changing system adapted to be energized by a source of alternating current comprising, in combination, magnetic core means, a tuned circuit having a winding magnetically coupled to the magnetic core means, the said tuned circuit being adapted to be energized by the source of alternating current, a second tuned circuit having a winding magnetically coupled to the magnetic core means and arranged to receive energy from the said energized first mentioned tuned circuit, means for tuning each of the two tuned circuits at such a frequency that the sum of the tuned frequencies of the two tuned circuits substantially equals to an integer times the frequency of the alternating current supply source, means for causing a transient starting condition in the system, and a stabilizing output transformer having a winding shunting a portion of the second mentioned tuned circuit for providing a current having the desired changed frequency.

19. A frequency changing system comprising, in combination, an arrangement of a plurality of magnetically coupled circuits disposed to be energized by a single frequency source of alternating current and adapted to cause currents of at least three beat frequencies to flow in the system, said arrangement being further adapted that one of the said frequencies is less than the frequency of the single frequency source, and output means shunting a portion of one of the said plurality of magnetically coupled circuits for providing a current having the desired changed frequency.

20. A frequency changing system comprising, in combination, an arrangement of a plurality of magnetically coupled circuits disposed to be energized by a single frequency source of alternating current and adapted to cause currents of at least three beat frequencies to flow in the system, said arrangement being further adapted that one of the said frequencies is less than the frequency of the single frequency source, output means shunting a portion of one of the said plurality of magnetically coupled circuits for providing a current having the desired changed frequency, and means for causing a transient starting electrical condition in the system.

CLOSMAN P. STOCKER.